United States Patent
Bernabeu-Auban et al.

(10) Patent No.: US 7,434,235 B2
(45) Date of Patent: Oct. 7, 2008

(54) TYPE SERVER CACHING THE PROXY/STUB GENERATION

(75) Inventors: Jose M. Bernabeu-Auban, Sammamish, WA (US); Frank V. Peschel-Gallee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 11/130,293

(22) Filed: May 16, 2005

(65) Prior Publication Data

US 2006/0259540 A1    Nov. 16, 2006

(51) Int. Cl.
*G06F 13/00* (2006.01)
(52) U.S. Cl. ....................................... 719/330
(58) Field of Classification Search ................. 719/330, 719/331, 332
See application file for complete search history.

(56) References Cited

U.S. PATENT DOCUMENTS 7,171,672 B2 *  1/2007  Just ............................ 719/330

2004/0083483 A1 *  4/2004  Yamamoto et al. .......... 719/316
2004/0205771 A1 * 10/2004  Sudarshan et al. .......... 719/316

OTHER PUBLICATIONS

Mitchell, J.G. et al., "An Overview of the Spring System", *Compcon: Digest of Technical Papers*, 1994, 39, 122-131.

* cited by examiner

*Primary Examiner*—Andy Ho
(74) *Attorney, Agent, or Firm*—Woodcock Washburn LLP

(57) ABSTRACT

A type server provides the proxy and stub code needed by client and server programs on demand (dynamically), when the code is needed during execution. When an interface for a resource is defined, the proxy code and the stub code for the type of resource is generated and stored within the type server. The client and server programs each keep a local table of type identifiers/resource type translations for each resource referenced. The local table acts like a cache: when a type identifier is not found in the table, the type server is contacted, and the type identifier for that resource type is retrieved and stored in the cache. Another local table acting as a cache stores type ID and associated proxy and stub code for the resource type. When a program needs the proxy code for a resource type, it checks its cache and it the proxy code is not found the type server is contacted, the proxy (and stub) code is retrieved from the type server and is stored in the cache.

17 Claims, 6 Drawing Sheets

TYPE SERVER CACHING THE PROXY/STUB GENERATION

CROSS-REFERENCE TO RELATED CASES

This application is related in subject matter to U.S. patent application Ser. No. 11/130,308 entitled "Coordinating Reference Counting Between Entities Executing Within Separate Address Spaces" filed May 16, 2005, U.S. patent application Ser. No. 11/129,848 entitled "A Cancellation Mechanism for Cooperative Systems" filed May 16, 2005, U.S. patent application Ser. No. 11/130,301 entitled "Self-Registering Objects for an Inter-Process Communication Mechanism" filed May 16, 2005, U.S. patent application Ser. No. 11/129,847 entitled "Structuring An Operating System Using A Service Architecture" filed May 16, 2005, and U.S. patent application Ser. No. 11/130,300, and entitled "Coordination of Set Enumeration Information Between Independent Agents" filed May 16, 2005.

FIELD OF THE INVENTION

The invention relates to sharing resources in computer systems and in particular to a mechanism that allows greater flexibility in managing resource sharing.

BACKGROUND OF THE INVENTION

A standard way to communicate between two processes A and B (running on the same machine or running on different machines) is to send a message. Often, for example, it is desirable to enable process A to send a message to process B asking process B to execute code on behalf of process A. Typically, process A must have knowledge of a port or contact point for process B in order to do this.

One way to enable process A to call process B is via a remote procedure call (RPC). A remote procedure call enables a process on one computer to cause code to be executed in another process on the same or on a different computer, without requiring explicit code to be written by a developer or programmer to perform that particular call. An RPC is initiated by the caller process (client) sending a request message to a remote system or second process (server) to execute a certain procedure using supplied arguments. A result message is returned to the caller. For example, in a remote procedure call, a function call may be made by process A, in which the name of the procedure that process B is to execute on behalf of process A and a set of parameters for the procedure, are specified. Process B executes the code and returns a message to process A. When the code in question is written using principles of object-oriented programming, RPC is sometimes referred to as remote invocation or remote method invocation.

A remote procedure call typically follows a particular protocol (another way of saying this is "it uses a particular interface") so that potentially unrelated processes can communicate. The protocol or interface defines the methods and the values which the processes agree upon in order to cooperate.

The procedure of transforming the function call into a message is called marshalling. Marshalling may include gathering data from one or more applications or non-contiguous sources in computer storage, putting the data pieces into a message buffer, and organizing or converting the data into a format that is prescribed for a particular receiver or programming interface. Marshalling typically converts what the code in process A sees as a function call into a message to be sent to process B. The message typically includes the name of the function and a set of parameters, coded in a way that process B understands. Process B receives the message and has to transform the message into a call to process B's internal function. The process of converting a message into a function call is called unmarshalling. The piece of code that performs marshalling in process A is called a proxy and typically resides in the client process. The corresponding piece of code on the server side that performs unmarshalling is called a stub.

Within the context of object oriented programming, process A and process B can be viewed as objects encapsulating data and functions. Some well-known technologies that take this approach are Sun Microsystem's JAVA and Microsoft's COM and DCOM. That is, process B may be viewed as a container for one or multiple objects, whose methods are the functions invoked by process A. In object oriented systems, therefore, process A invokes a method of a particular object of process B instead of invoking a function in process B. To do this, process A must have some way of identifying the object in process B that process A wishes to invoke.

The data stored in process A which enables process A to identify the object of process B is known as a reference to the object. The reference stores information concerning how to locate the object: that is, the reference must be sufficient to identify the process and within the process to identify the object whose method is to be invoked.

It is often desirable to share resources within a computer system. As described above, one convenient way to share resources is through an interface that provides programmatic access to the shared resource. The program responsible for the resource is called the server and employs a stub program to handle access requests for the particular type of resource being shared. The program seeking access is called the client and employs a proxy program to make the request for the particular type of resource being requested.

A server that exports a reference to one of its objects, should also ensure that the right stub programs to handle possible incoming invocations for that object are available. Similarly, the client receiving the reference should be able to correctly associate the reference with a proxy program for one of the interfaces the object implements. Typically, however, the client and proxy programs are compiled and linked together to generate a single executable image on the client for the type of resource being requested. Similarly, the server and the stub programs are typically compiled and linked together to generate a single executable image on the server for the type of resource being shared. This approach requires knowledge at the time of compilation and linkage of the types of resources that a client might use. However, the types of resources that a client might use may not be known at compile/link time. It would be helpful if there were a mechanism that enabled proxy and stub code to be served "on demand" when needed during execution, instead of being compiled into an executable image before execution.

SUMMARY OF THE INVENTION

Greater flexibility in managing resource sharing is provided by a type server that provides the proxy and stub code needed by client and server programs on demand (dynamically), when the code is needed during execution. When an interface for a resource is defined, the proxy code and the stub code for the type of resource is generated and stored within the type server. Because the names of the resource types may be long and it is not efficient to send long names in inter-process communications, the resource types are assigned type identifiers (type IDs). The client and server programs each keep a local table of type identifiers/resource type translations for each resource referenced. The local table acts like a cache: when a type identifier is not found in the table at the client, the type server is contacted, and the type identifier for that resource type is retrieved and stored in the client cache. Another local table at the client acting as a cache stores type ID and associated proxy and stub code for the resource type. When a program needs the proxy code for a resource type, it checks its cache and if the proxy code is not found the type server is contacted, the proxy (and stub) code is retrieved from the type server and is stored in the cache.

When the type server receives a request for a proxy for a resource type, it checks to see if the proxy code has already been generated. If the proxy code has already been generated, the code is sent to the requestor. If the proxy code has not already been generated, the code is generated, saved in the proxy/stub store and is sent to the requester. Alternatively, the type server may generate the proxy/stub code for a resource type when the type description is received by the type server. Type description may be received whenever a new resource type is defined within the code in the computer system.

When a client receives a reference to an object, inheritance relationships between different interfaces must sometimes be determined to associate a correct proxy program to the reference. The type server may be accessed to obtain the set of interfaces from which a particular interface inherits.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In accordance with the invention, a mechanism that allows greater flexibility in managing resource sharing is provided. A type server provides the proxy code needed by the client and the stub code needed by the server on demand, (dynamically) when the program needs the code to either access a resource or share the resource. For example, to request a resource, a first process may send a message to a second process, referencing an object in the second process. In order for the second process to be able to understand the message received from the first process, an agreed-upon interface is used. The interface defines the methods and the data types of the arguments the methods take, agreed upon by the processes. Marshalling is the process of transforming internal method invocations into a message understandable by the receiver. That is, marshalling typically converts what the code in the first process understands as a method invocation into a message to be sent to the second process. The code that performs this conversion is called a proxy and resides in the first process. In order to communicate successfully, proxy code for the type of the interface used must be available. That is, if the object being referenced is of type I, it will implement an interface of type I and therefore proxy code for an interface of type I must be available.

The second process receives the message and has to transform the message into a method invocation on its object. The process of converting a message into a method invocation is called unmarshalling and is performed by a piece of code residing in the second process called a stub. The proxy of the first process and the stub of the second process are complementary pieces of code. That is, just as performing a call from the first process using a reference to an object in the second process requires a proxy corresponding to the type of the interface associated with the object of the second process, a stub for that interface type must also be available at the server for receiving the request. Hence it is desirable that proxy and stub code for a particular interface type be generated at the same time.

For example, suppose the first process (acting in a particular interaction as a client process) is process A, and the second process (acting as a server process in this particular interaction) is process B. Assume that process B provides process A with a reference to one of process B's resources: object 1. Suppose further, that object 1 implements interface I. In order for process A to invoke object 1, process A must have access to a proxy (code that performs marshalling of the request) that is able to invoke the methods of object 1 defined by interface I. In accordance with some embodiments of the invention, a type server manages interface types and provides proxy and stub code for the interface type to a process (i.e., during execution of a program rather than at compilation time). In some embodiments of the invention, proxy and stub code for an interface type associated with an object is received when a reference from another process is received. Thus, loading of the proxy (and optionally stub code) may be delayed until execution of the program.

The reference held by a process to an object of another process stores information concerning how to locate the object and what methods can be invoked on the object. The set of methods the object supports is often referred to as the object's interface and it is said that the object "implements" the interface. To facilitate the definition of interfaces, interfaces may be subject to the principles of inheritance. According to general principles of inheritance, when a class of objects is defined, any subclass that is defined can inherit the definitions of one or more general classes. For the programmer this means that an object in a subclass need not carry its own definition of data and methods generic to the class (or classes) of which it is a part. In addition to easing development, inheritance also provides an inherent validity to the defined subclass object (that is, what works and is consistent about the class will also work for the subclass). The principles of inheritance applied to interfaces mean that if all objects implementing the methods of interface I should also implement the methods of interface J, interface I can inherit from interface J. Thus an object may implement more than one interface.

In accordance with the invention, when a client receives a reference to an object, the reference must be associated with the proxy program for one of the interfaces the object implements. To properly associate a proxy program to the reference, knowledge of inheritance relationships between different interfaces may be required. In accordance with some embodiments of the invention, therefore, when passing an object reference, the type information of the object reference is also passed. A type server may provide the information concerning inheritance relationships such as the set of interfaces from which a particular interface inherits.

Exemplary Computing Environment

Figure 1:
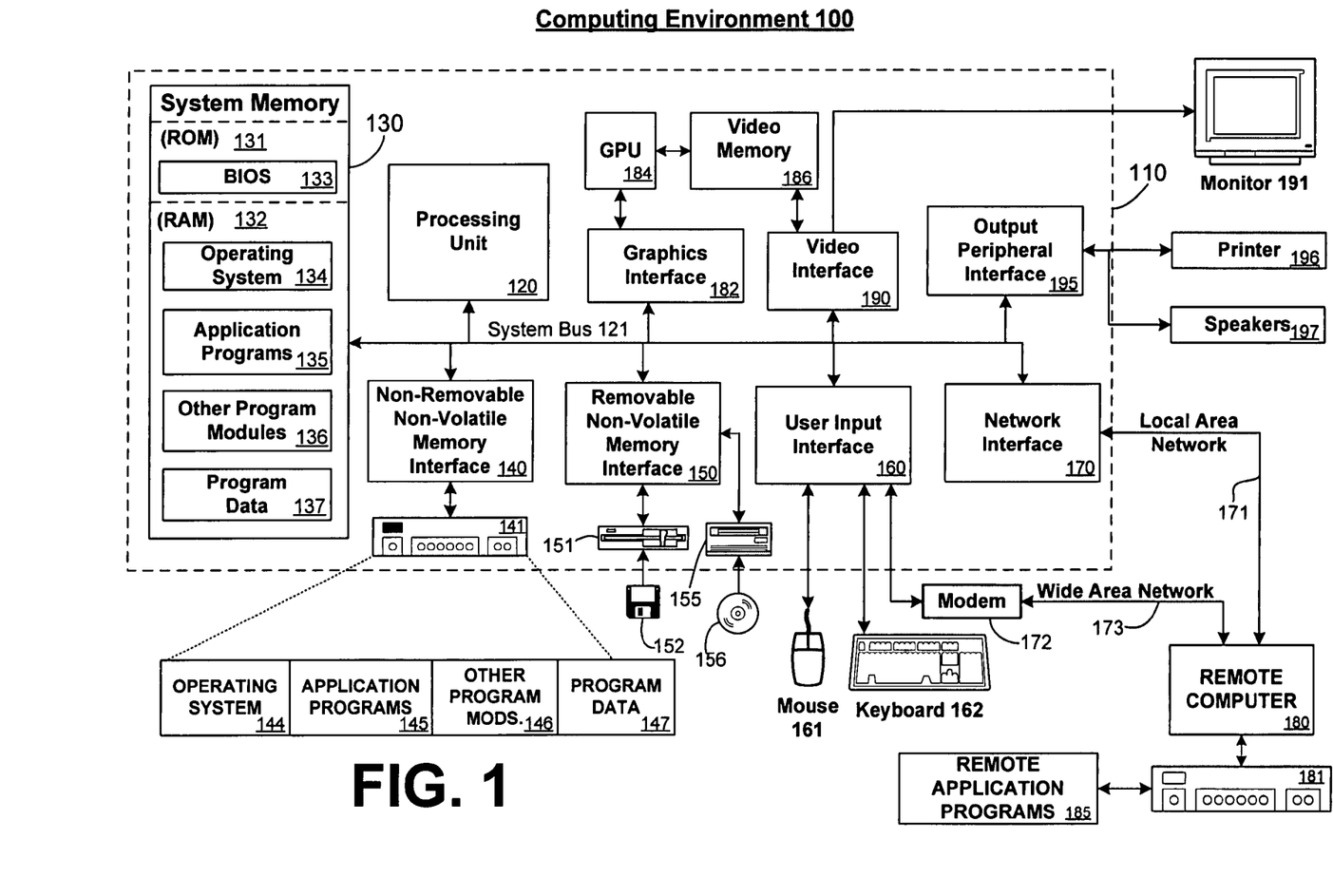
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Caching Proxy and Stub Code

Figure 2:
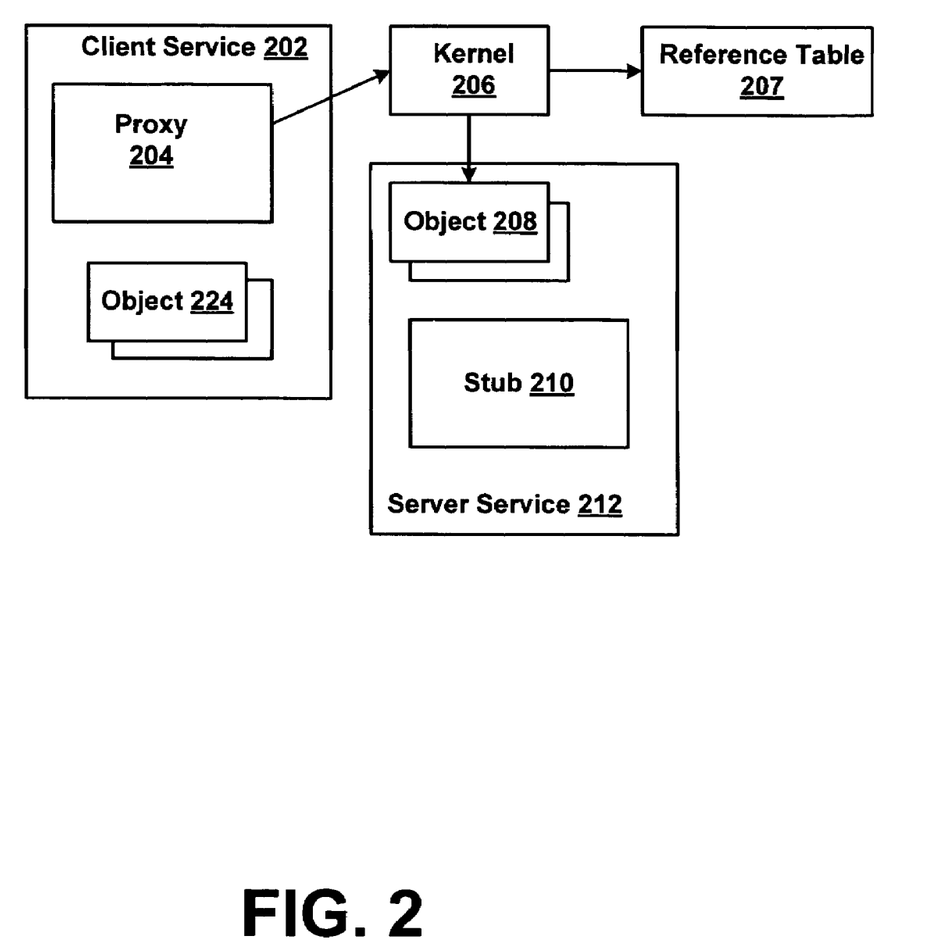
FIG. 2 is a block diagram illustrating relationships between services in an exemplary service-based operating system in accordance with one embodiment of the invention.

FIG. 2 is a block diagram illustrating the relationship of services in a service-based operating system in accordance with some embodiments of the invention. The operating system or portions thereof may reside on or may access one or more computers such as computer 110 described with respect to FIG. 1.

In some embodiments of the invention, the operating system includes entities that are processes, agents, services, components or modules comprising containers for objects or resources that are described through interfaces. FIG. 2 illustrates an exemplary "client" service 202 and an exemplary "server" service 212, although it will be appreciated that any number of client services and server services may exist in the operating system. Moreover, a "client" service in one interaction may act as a "server" service in another: that is, "client" and "server" terminology refers to roles within a particular interaction rather than to intrinsic differences in hardware, software, and so on. Each service may be implemented through the use of one or more objects. For example, in FIG. 2, the client service 202 includes a proxy object 204. The client service 202 may also include one or more other objects or resources, as represented by object 224. Similarly, the server service 212 may include a stub 210 and one or more objects, as represented by object 208. A service may require support from one or more other services and the code specifying the service may require the loading of specific run-time support to run correctly. Services may reside in the same address space in the local machine or in a computer of a computer network. Services alternatively may reside in different address spaces in the local machine or on different computers of a computer network.

A trusted entity may be viewed as a unique distinctive process, module, component, agent or service that mediates communications between processes in the system. In some embodiments the trusted entity is able to distinguish between data parameters and reference parameters in messages passed between processes. In some embodiments the trusted entity has a trusted channel to every agent, service, module, component or process for mediating resource access and reference. Communications with the trusted entity therefore are secure, meaning that processes other than the trusted entity are unable to access or modify transmissions or messages sent between processes. Moreover, the trusted entity may be capable of identifying the originator of a message.

In some embodiments of the invention, the trusted entity is the kernel 206. The kernel 206 can implement and expose its objects (not shown) to other services, such as to services 202 and 212 in FIG. 2. In some embodiments of the invention, the kernel 206 is trusted code. In some embodiments of the invention, the only trusted code is the kernel 206. In some embodiments, to avoid forgery of object references, only trusted code is able to manipulate an object reference. Hence in some embodiments of the invention, only the kernel 206 is able to manipulate an object reference. A service that holds a reference to an object refers to the reference by a representation referred to herein as a reference or as a local reference id. In some embodiments of the invention, the local reference id is understood only by the kernel 206. Hence, for example, a communication sent by client service 202 to a server service 212 invoking a method of object 208 would be mediated by kernel 206. Kernel 206 in some embodiments of the invention, creates and maintains one or more reference tables, as represented by reference table 207 in FIG. 2, to resolve the object reference received from client service 202 to the address of an object 208 to be invoked.

A service may communicate with another service by sending a method invocation to another object via an object reference (e.g., via a remote call). All communications among services are assumed to be and are treated as though they are remote. The client and server services may be in separate (remote) containers or may be co-located in the same container but in either case, the semantics of the call is remote.

A service interface may be specified in an interface definition language or via a contract. In some embodiments of the invention, a subset of an existing language, such as but not limited to C#, is used to define the contract. In some embodiments of the invention, a subset of the application implementation language, such as but not limited to C#, is used to define the interfaces. A service written in C# therefore will seamlessly integrate with the C# contract without requiring the mapping necessitated in traditional systems which use an IDL language for contracts. Services written in other languages such as for example, unmanaged C++ may have a translation table which maps constructs from the C# interface to constructs in C++. Resultant C++ services can interoperate with the C# service as long as the system service model and interface definitions are not violated.

Services may be mapped in a one to one relation to an address space. If such is the case, protection ensues as a consequence of the address space provided by the memory management unit. Alternatively, in some embodiments, multiple services can be located within the same address space. In this case, protection is obtained by a managed code run-time (such as, for example, Microsoft's CLR or Common Language Runtime). Services communicate with each other independent of their location.

Failure and security boundaries in the system may exist at the service level and may be reinforced by hardware protection at the address space and machine levels. Service recovery actions including the ability to restart, and dependency tracking are provided by the operating system. Optimizations may accrue for services that are located within the same address space.

A method invocation can only be interpreted by the receiving object. The receiving object decides what action or actions are to be taken, based on the information passed with the invocation. The information passed may include specific data structures and/or references the invoker passes to the object being invoked.

The set of invocations an object accepts through a particular reference and the way the object is supposed to react to such an invocation is referred to as the interface supported by the object through that reference. Hence, the kernel will not necessarily know what the particular interface implemented by a referenced object is and does not need access to that information. It will be appreciated that it is possible to have different references designating the same object implementation through different interfaces.

An object in some embodiments is an implementation of an interface within some service and is an independent unit of failure. An object may be expressed and coded in any programming language capable of passing parameters and control.

An object reference in some embodiments identifies the object to which the reference refers and is not able to be forged. A reference confers to the holder the authority to invoke any of the methods of the interface for which the reference to the object was created. An object reference may be revoked and may be passed (optionally with restrictions) to another service or to other services as an argument of an invocation or as return results.

Use of an interface so defined enables the definition of a class implementing the interface and whose method implementations are stubs which perform the task of parameter marshalling. Instances of such a class are herein referred to as proxies, the proxies sitting in for the actual objects to which they refer and having the same interface.

Figure 3:
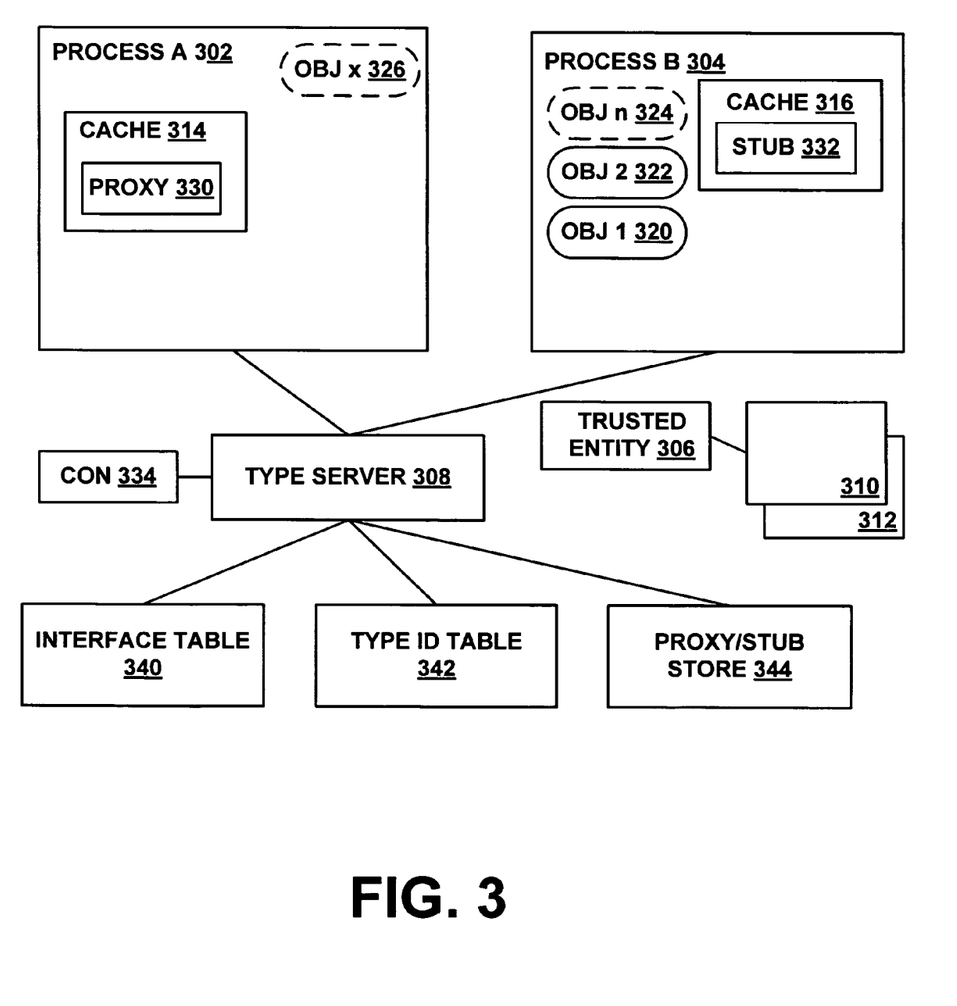
FIG. 3 is a block diagram of an exemplary system for caching proxy and stub code in accordance with one embodiment of the invention.

A system for caching proxy/stub generation may include one or more processes, entities, agents or services including one or more objects or resources that may be shared with one or more other processes, agents or services. The system may also include one or more tables for storing information about shared objects or resources, and/or an independent entity, process, service or agent that mediates communications between processes, entities, agents or services. FIG. 3 is a block diagram of a system for caching proxy/stub generation in accordance with one embodiment of the invention. The system of FIG. 3 or portions thereof may reside on one or more computers such as the computer 110 described above with respect to FIG. 1.

A system for caching proxy/stub generation may include one or more of the following elements or components: a type server 308, contract files (represented by contract file 334), one or more tables such as exemplary tables 340 and 342, a proxy/stub store 344, one or more client processes, modules, components or agents such as exemplary client process A 302 and one or more server processes, modules, components or agents such as exemplary server process B 304. One or more client processes such as exemplary client process A 302 and one or more server processes, modules, components or agents such as exemplary server process B 304 may include caches 314, 316 (in-memory tables) for storing proxy and stub code such as, for example, proxy 330 and stub 332. Processes such as process A 302 and process B 304, a trusted entity 306, tables associated with the trusted entity 306 such as exemplary tables 310 and 312 as well as other elements not here shown. It will be appreciated that although process A 302 is denoted as a client process in the interaction illustrated, process A 302 may also act as a server in another interaction. Similarly, although process B 304 is denoted as a server in the interaction illustrated, process B 304 may be a client in another interaction. That is, "client" and "server" terminology refers to roles within a particular interaction rather than intrinsic differences in hardware, software, and so on.

A type server 308 in some embodiments of the invention is a component, module, agent or process that may receive a request message from another component, module, agent or process and return a result message to the requester. The type server 308 may be associated with one or more tables such as interface table 340 and type ID table 342. Alternatively, the two tables may be combined into one table indexed by both interface name and interface type ID. The type ID table 342 may include one or more entries, each entry including a type ID element, a pointer to a location of a proxy for that type ID and a pointer to a location of a stub for that type ID. In some embodiments of the invention, the pointer points to a location in the proxy/stub store 344, described below. The interface table 340 in some embodiments includes one or more entries, each entry including a name of an interface type and the type ID assigned to the interface.

The type server 308 may also be associated with a proxy/stub store 344. In some embodiments of the invention, the proxy/stub store 344 may comprise proxies and stubs for interfaces. In some embodiments of the invention, the proxy/stub store 344 is indexed by interface type ID. In some embodiments of the invention, whenever a software component is added to the system, any new types of interfaces introduced by the component are defined in one or more contract files (as represented by contract file 334). A contract file may include one or more definitions of resources or object interfaces and may define a set of related interfaces and data types required to define the interfaces. For example, an interface definition may include a list of data types the interface uses, a list of parameters or arguments expected or allowed by the interface, a list of methods that the interface is used for, inheritance relationships and so on. In response to receiving the contract file, the type server 308 may analyze the contract file and extract from it (if present) one or more new interface types defined within the contract file. For each new interface type found in the contract file, the type server 308 may determine any inheritance relationships involved with the new interface type and correlate any inheritance relationships found in the new interface with inheritance relationships associated with existing interface types. The type server 308 may assign a type identifier (type ID) to the new interface type encountered and may generate an entry for the new interface type in a table of interface types (e.g., interface table 340 and/or type ID table 342). The table of interface types 342 may be indexed by type ID and may include one or more of the following elements: an interface type identifier (type ID), and a list or ordered set representing inheritance relationships. For example, suppose that an interface I inherits from interface $I_1$ and interface $I_2$ and that interface $I_1$ and interface $I_2$ inherit from interface $I_0$. The list representing this inheritance relationship may be represented as $I_1 \rightarrow I_2 \rightarrow I_0$. The type server 308 may also generate a proxy and stub for the new interface type. The type server may persist the proxy and stub in a proxy/stub datastore 344.

The type server 308 may receive a request from a client process (e.g., process A 302) for information associated with a type identifier. In response to the request, the type server 308 may access the type ID table 342 and return the type name, and a proxy and stub for the type ID. The type server 308 may also receive a message from a process (e.g., process A 302 or process B 304) to whom a reference to an object has been exported or passed. The process may send a message to the type server 308 requesting information concerning the interface implemented by the exported or passed object and may request a proxy for the interface type the object implements.

The type server 308 may access a table (such as the type ID table 342, indexed by type ID) and send the requesting process information including one or more of: the name of the interface type identified by type ID, the type ID of the interface implemented by the object, the proxy required for that interface type and the stub required for that interface type. For reasons of efficiency, the proxy and stub code for the interface type may both be sent, even though the requesting process may only require proxy code, or stub code at the present time. It will be appreciated that it may be advantageous to send both the stub code and the proxy code at the same time because the proxy code and stub code for an interface type are very closely related and even minor changes to the interface are likely to require corresponding changes to the proxy and stub code. In another embodiment, the proxy code may be sent without the stub code and vice versa. The receiving process may store the information received from the type server 308 in a cache (e.g., exemplary cache 314).

The type server 308 may also receive a message from a process (e.g., process A 302 or process B 304) that is exporting an object to another process. In some embodiments of the invention, when a reference to an object is exported to another process, (a reference is exported when a reference to the object is sent by the owner of the object to another object) the message that is sent to the receiving process includes the type ID of the interface the object implements. The exporting process may send a request to the type server 308 to provide a type ID for the interface if the exporting process does not already know the type ID assigned to the interface. In response to this request, the type server 308 may access a table (such as the interface table, indexed by interface name 340) and return to the requesting process the type ID assigned to that interface.

In some embodiments of the invention, a client or server process may request proxy code, stub code or other information associated with a interface identified by interface type ID. In response to such a request the type ID table 342 (indexed by type ID) may then be accessed. The information sent to the requesting process may include one or more of: the name of the interface type identified by the type ID, the type ID of the interface implemented by the object, the proxy required for that interface type and/or the stub required for that interface type. For reasons of efficiency, the proxy and stub code may both be sent, even though the requesting process may only require proxy code, or stub code at the present time. It will be appreciated that it may be advantageous to send both the stub code and the proxy code at the same time because the proxy code and stub code for an interface type are very closely related and even minor changes to the interface are likely to require corresponding changes to the proxy and stub code. In another embodiment, the proxy code may be sent without the stub code and vice versa. The requesting process may store the information received from the type server 308 in a cache (e.g., cache 316).

For example, a process (such as process B 304, for example) may send the type server a message including the interface name for which the type identifier (type ID) is desired. In response, the type server 308 may access a table (e.g., table 340) indexed by interface type name and retrieve the type ID associated with the interface type name. The type server 308 may return this message to process B 304. The type server 308 may also receive a message from a process such as exemplary process A 302 or process B 304 including the type ID of an interface type associated with an object or resource. For example, process A 302 may send a message to the type server 308 including type ID 1, the type ID of an interface implemented by object 1 320. In response the type server 308 may return a proxy and stub for the interface represented by type ID 1. Process A 302 may save this information in cache 314.

Process A 302 and process B 304 may include one or more objects. In FIG. 3, process B 304 as illustrated includes object 1 320, object 2 322 . . . object n 324. Similarly, process A 302 as illustrated in FIG. 3 includes exemplary object x 326, although it will be appreciated that process A 302 and process B 304 may include any number of objects. Process A 302 may export one or more of its objects (e.g., object x 326) to other processes (e.g., to process B). Similarly, process B 304 may export one or more of its objects (e.g., one or more of objects: object 1 320, object 2, 322. . . object n 324) to other processes (e.g., to process A 302). Process A 302 may import or reference an object that has been exported to it (such as, for example, one or more of objects object 1 320, object 2 322 . . . object n 324) by other processes (such as, for example, by process B 304). Similarly, process B 304 may import or reference an object (such as, for example, object x 326) exported to it by other processes (such as, for example, by process A 302).

A trusted entity 306 in some embodiments of the invention mediates communications between processes such as those between process A 302 and process B 304 and vice versa. In some embodiments of the invention, trusted entity 306 is the kernel of an operating system. Communication channels between processes and the trusted entity 306 are secure. Furthermore, the trusted entity can identify the originator of a message. The trusted entity 306 may maintain a table of imported and exported object references for each process (e.g., tables 310 and 312). Tables maintained by the trusted entity 306 for each process may include one or more of the following for each object in the table: an index (an even numbered index may indicate that the object is an exported object, an odd numbered index may indicate the object is an imported object), a location of the object in the originating process and an identification of the process to which the object was exported or from which the object was imported.

Figure 4:
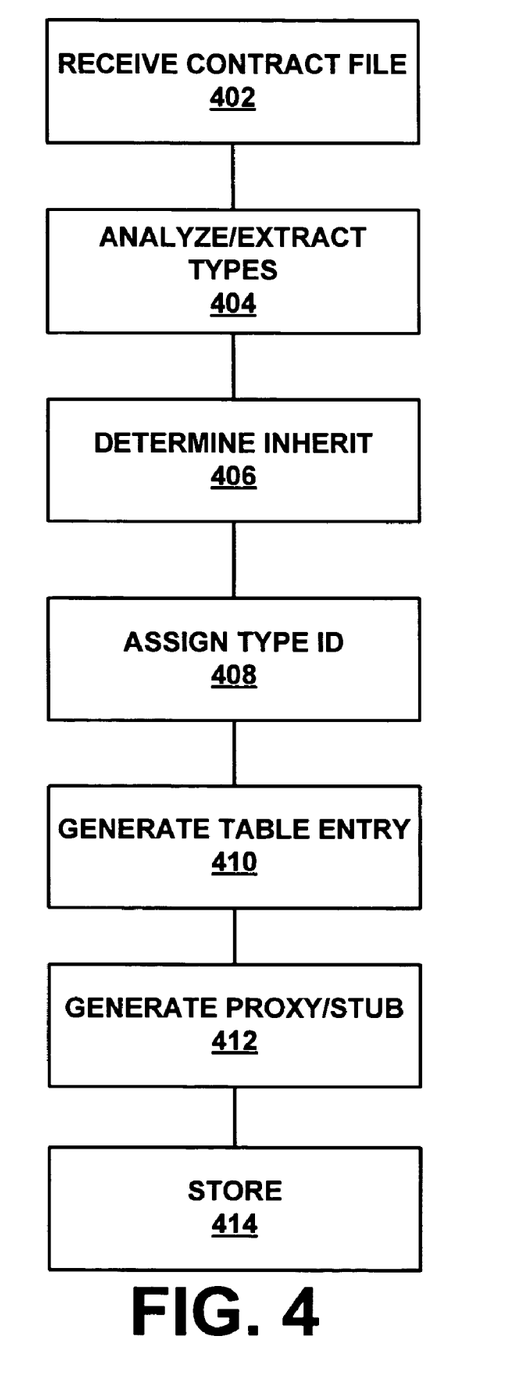
FIG. 4 is a flow diagram of a portion of an exemplary method for caching proxy and stub code in accordance with one embodiment of the invention.

FIG. 4 is a flow diagram of a portion of an exemplary method for caching proxy/stub generation in accordance with some embodiments of the invention. It will be appreciated that some actions may be performed in a sequence other than that shown in FIG. 4, and may include fewer or more actions than illustrated. That is, the flow diagram of FIG. 4 is exemplary only and is not intended to limit the contemplated invention to the particular sequence or number of actions shown.

In some embodiments of the invention, whenever a software component is added to the system, any new types of interfaces introduced by the component are defined in a contract file. The contract file may include one or more definitions of resources or object interfaces. For example, an interface definition may include a list of data types the interface uses, a list of parameters or arguments expected or allowed by the interface, a list of methods that the interface is used for and so on. At 402, the contract file is received by the type server, described above with respect to FIG. 3. At 404 the type server in some embodiments analyses the contract file and extracts from it (if present) a new interface type defined within the contract file. At 406, for the new interface type found in the contract file, the type server may determine any inheritance relationships involved with the new interface type and correlate any inheritance relationships found in the new interface with inheritance relationships associated with existing interface types. At 408 the type server may assign a type identifier (type ID) to the new interface type encountered. At 410 the type server may generate an entry for the new interface type in a table of interface types. The table of interface types may be indexed by type ID and may include one or more of the following elements: an interface type identifier (type ID), a list or ordered set representing inheritance relationships and other information associated with the interface. For example, suppose that an interface I inherits from interface $I_1$ and interface $I_2$ and that interface $I_1$ and interface $I_2$ inherits from interface $I_0$. The list representing this inheritance relationship may be represented as $I_1 \rightarrow I_2 \rightarrow I_0$. At 412 a proxy and stub may be generated for the new interface type. At 414 the type server may persist the proxy and stub in a proxy/stub datastore. Acts 404 through 408 may be repeated for each new interface type in the contract file.

Figure 5:
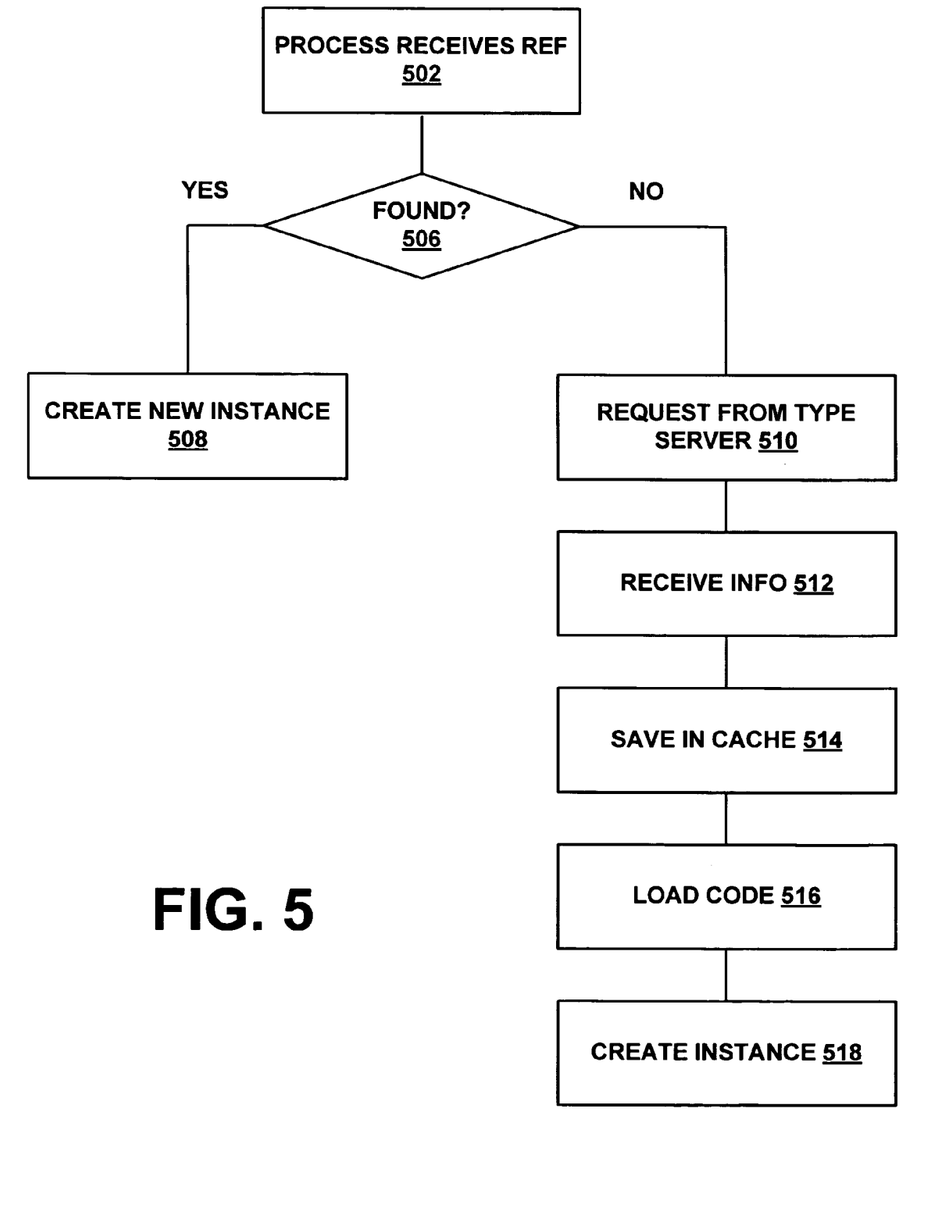
FIG. 5 is a flow diagram of another portion of an exemplary method for caching proxy and stub code in accordance with one embodiment of the invention.

FIG. 5 illustrates another aspect of an exemplary method for caching proxy/stub generation occurring during execution of the requesting process. At 502, a process may receive a message from another process. The message may include, for example, a reference to an object that the second process is exporting to the first process and may include a type ID associated with the interface implemented by the exported object. The message also may be a message from a second process, the message including a reference to an object of a third process that the second process is passing to the first process. The message may include a type ID associated with the interface implemented by the object for which the reference is passed. At 506, the first process may search a cached store of proxies and stubs indexed by type ID for the type ID of the received reference. If the type ID is found, a new instance of the proxy may be created and associated with the received reference (508). If the type ID is not found, the first process may send a message at 510 to the type server, requesting information associated with the type ID.

In some embodiments of the invention, the proxy code may be available to the first process because the proxy code (and optionally the associated stub code) was compiled into the program code of the first process. In some embodiments, in addition to searching the cache table, the portion of the address space used for storing executables may be searched for the appropriate proxy code for the interface identified by the type ID. Alternatively, in some embodiments of the invention, an indicator may be placed in the cache so that this separate search is not required. If the appropriate proxy code is not found, the first process may send a message at 510 to the type server, requesting information associated with the type ID.

At 512 the type server may search its proxy/stub datastore and return the requested proxy/stub to the first process. The first process may receive the requested information including one or more of: the name of the interface type identified by type ID, the proxy required for that interface type and the stub required for that interface type. One or more pieces of the received information may be stored in the proxy/stub cache for the first process at 514. The cache may be implemented as an in-memory table associated with the process and table may be indexed by type ID. It will be appreciated that although the stub code may not be needed by the first process at this time, because the first process is acting as a client in this particular interaction, in another interaction the first process may be acting as a server and would in that case need the stub code. For reasons of efficiency, the proxy and stub code may be sent in the first interaction. In another embodiment, the proxy code may be sent without the stub code and vice versa. At 516 the proxy/stub code may be loaded and an instance of the proxy/stub created and associated with the received reference (518).

For example, suppose process A receives a message from process B including a reference to object 1 of process B. The message may also include the type ID of an interface implemented by object 1. Suppose the type ID of the interface implemented by object 1 is type ID 1. If process A's cache table already includes the proxy code for type ID 1, a new instance of the proxy code is created and associated with the received reference, enabling process A to access object 1 in process B. In some embodiments, process A may already have the proxy code for type.

If process A's cache table does not include the proxy code for type ID 1, process A may send a message to the type server requesting information about type ID 1 using a reference to one of type server's objects received by process A upon startup. Process A may receive the requested information from the type server. The information received from the type server may include one or more of the following items: the interface name of type ID 1, proxy code compatible with the interface identified by type ID 1 and stub code compatible with the interface identified by type ID 1. Process A may store one or more pieces of the received information in process A's cache table, load the proxy code into the executable portion of the process container, create an instance of the proxy and associate it with the received reference.

Figure 6:
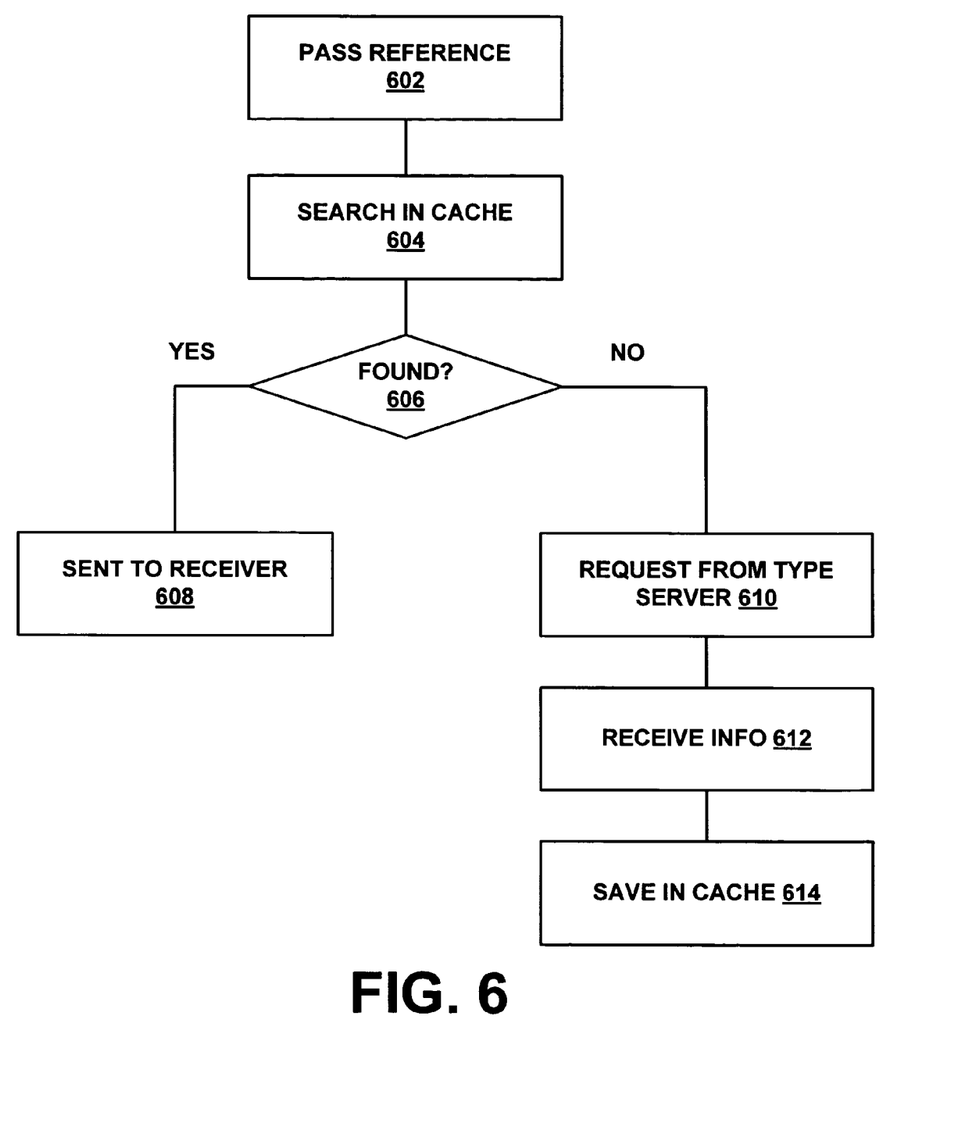
FIG. 6 is a flow diagram of another portion of an exemplary method for caching proxy and stub code in accordance with one embodiment of the invention.

FIG. 6 illustrates another portion of an exemplary method for caching proxy/stub generation. In some embodiments of the invention, when a process, module, agent or component such as process B exports or passes an object reference, the process may know only the interface type name, but not the type ID associated with the object. At 602 the process may decide to export or pass an object reference. At 604 the process may search its cache (described above) to determine if an interface type identifier for an interface type for the object to be exported or passed is known. If the type ID is known (606), the information may be sent to the receiving process at 608. If the type ID is not in the proxy/stub cache table that process B keeps, at 610 the server process may send the type server a message including the type name. The type server may access a table indexed by interface type name and retrieve the type ID associated with the interface type name. The type server may return this message to process B at 612. The type server may return a message to process B including one or more of the following items: the type ID for the type name received from process B, a proxy associated with the type ID and a stub associated with the type ID. Process B may store this information in its cache at 614.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A computer system for resource-sharing, the system comprising:
   circuitry for effectuating a first process including a first address space, wherein the first address space includes a cache;
   circuitry for receiving a reference to an object stored in a second process;
   circuitry for determining that the first process does not include code operable to generate a proxy configured to access the object;
   circuitry for determining that the cache does not include the code operable to generate the proxy;
   circuitry for querying a type server for the proxy code;
   circuitry for receiving, from the type server, information comprising the code operable to generate the proxy associated with an interface type for the object during execution of the first process; and
   circuitry for generating the proxy from the received code to access the object stored in the second process.

2. The system of claim 1, wherein the circuitry for querying the type sewer further comprises:
   circuitry for querying the type server, wherein the query includes a type identifier for the object.

3. The system of claim 2, wherein the query includes a pointer to the proxy code.

4. The system of claim 1, further comprising:
   information comprising code configured to generate a stub associated with the interface type for the object during execution of the first process.

5. The system of claim 1, wherein the received proxy code is stored in the cache.

6. The system of claim 5, wherein the cache comprises at least one stub of a plurality of stubs, the at least one stub associated with the interface type.

7. The system of claim 1, further comprising:
   circuitry for receiving, from the type server, inheritance relationships associated with the interface type.

8. The system of claim 1, further comprising:
   circuitry for receiving, from the type server, the inheritance relationships, wherein the inheritance relationships are correlated with the interface types.

9. A method for caching proxies and stubs comprising:
   extracting, by a type server, a new interface type from a contract file;

determining, by the type server, an inheritance relationship between the new interface type and interface types existing in a proxy/stub datastore;

assigning, by the type server, an interface type identifier to the new interface type;

generating, by the type server, code operable to generate a proxy for the new interface type and code operable to generate a stub for the new interface type;

storing, by the type server, the generated code operable to generate the proxy and the stub in the proxy/stub datastore;

receiving, by the type server, a request from a process for code operable to generate the proxy for the new interface wherein the process requests for the code operable to generate the proxy after determining that a cache stored in the same address space as the process does not include the code operable to generate the proxy; and transmitting, by the type server, the code operable to generate the proxy to the process.

10. The method of claim 9, further comprising:

generating an entry in a translation table indexed by an interface type field, the entry comprising the interface type identifier and the new interface type.

11. The method of claim 9, further comprising:

generating an entry in an interface type identifier table indexed by an interface type identifier field, the entry comprising the interface type identifier, a pointer to the proxy for the new interface type and a pointer to the stub for the new interface type.

12. A computer-readable storage medium including instructions, the computer-readable storage medium comprising:

instructions for receiving a message passing a reference to an object from a first agent to a second agent, the message comprising the reference and an interface type identifier for the object;

instructions for searching a cache associated with the first agent for a proxy associated with the interface type identifier; and instructions for sending a request for the proxy associated with the interface type identifier to a type server when the proxy associated with the interface type identifier is not in the cache.

13. The computer-readable storage medium of claim 12, further comprising:

instructions for receiving the proxy associated with the interface type identifier.

14. The computer-readable storage medium of claim 13, further comprising:

instructions for storing the proxy in the cache.

15. The computer-readable storage medium of claim 14, further comprising:

instructions for receiving a stub associated with the interface type identifier.

16. The computer-readable storage medium of claim 15, further comprising:

instructions for storing the stub in the cache.

17. The computer-readable storage medium of claim 12, further comprising further instructions for:

instructions for receiving inheritance relationships associated with the interface type identifier.

* * * * *

UNITED STATES PATENT AND TRADEMARK OFFICE
CERTIFICATE OF CORRECTION

| | | |
|---|---|---|
| PATENT NO. | : 7,434,235 B2 | Page 1 of 1 |
| APPLICATION NO. | : 11/130293 | |
| DATED | : October 7, 2008 | |
| INVENTOR(S) | : Jose M. Bernabeu-Auban et al. | |

It is certified that error appears in the above-identified patent and that said Letters Patent is hereby corrected as shown below:

In column 16, line 43, in Claim 2, delete "sewer" and insert -- server --, therefor.

Signed and Sealed this
Twenty-sixth Day of April, 2011

David J. Kappos
*Director of the United States Patent and Trademark Office*